United States Patent [19]
Bement et al.

[11] Patent Number: 5,881,063
[45] Date of Patent: Mar. 9, 1999

[54] HALF-MESSAGE BASED MULTIPLEX COMMUNICATION INTERFACE CIRCUIT WHICH USES A MAIN MICROCONTROLLER TO DETECT A MATCH IN ADDRESSES AND GENERATE A QUALIFIED SIGNAL

[75] Inventors: Bradley Earl Bement, Farmington Hills; Robert Dennis Crawford, Livonia, both of Mich.

[73] Assignee: Ford Motor Company, Dearborn, Mich.

[21] Appl. No.: 629,252

[22] Filed: Apr. 8, 1996

[51] Int. Cl.$^6$ .............................. H04L 12/28; H04L 12/56
[52] U.S. Cl. ............................................. 370/389; 370/419
[58] Field of Search .................... 370/212, 389, 370/419, 522

[56] References Cited

U.S. PATENT DOCUMENTS

| | | | |
|---|---|---|---|
| 4,534,025 | 8/1985 | Floyd | 370/85 |
| 4,623,997 | 11/1986 | Tulpule | 370/85 |
| 4,674,084 | 6/1987 | Suzuki et al. | 370/85 |
| 4,715,031 | 12/1987 | Crawford et al. | 370/85 |
| 4,745,596 | 5/1988 | Sato | 370/85 |
| 4,792,950 | 12/1988 | Volk et al. | 371/8 |
| 4,799,218 | 1/1989 | Sakagami et al. | 370/85 |
| 4,896,261 | 1/1990 | Nolan | 364/200 |
| 5,113,502 | 5/1992 | Merrill et al. | 395/375 |
| 5,287,523 | 2/1994 | Allison | 395/725 |
| 5,319,752 | 6/1994 | Peterson et al. | 395/250 |
| 5,343,475 | 8/1994 | Matsuda et al. | 370/94.1 |
| 5,363,405 | 11/1994 | Hormel | 375/7 |
| 5,400,331 | 3/1995 | Lucak et al. | 370/85.1 |
| 5,418,526 | 5/1995 | Crawford | 340/825.06 |
| 5,485,584 | 1/1996 | Hausman et al. | 395/842 |
| 5,495,469 | 2/1996 | Halter | 370/9 |

FOREIGN PATENT DOCUMENTS

US84/00054  1/1984  WIPO .

OTHER PUBLICATIONS

Lupini et al., "Class 2: General Motor's version of SAE J1850," 8th Int'l Conf on Auto Electronics, IEE, pp. 74–78, 1991.

Society of Automotive Engineers Recommended Practice J1850 Class B Data Communication Network Interface May 11, 1993.

*Primary Examiner*—Douglas W. Olms
*Assistant Examiner*—David R Vincent
*Attorney, Agent, or Firm*—Richard D. Dixon

[57] ABSTRACT

A method and circuit for receiving frame messages connected to one or more nodes, each controlled by a microcontroller, along a common transmission line of a multiplex communication system. The method includes the steps of: (a) receiving the type and target bytes, and responsive thereto generating a first interrupt signal to the microcontroller at the node; (b) commanding the microcontroller, responsive to receiving the first interrupt signal, for qualifying the frame message by retrieving and matching one or more of the type and target bytes with corresponding bytes stored in programmable memory within the microcontroller, and responsive thereto generating a qualified signal; and (c) receiving data bytes from the frame message only responsive to receiving the qualified signal from the microcontroller.

32 Claims, 6 Drawing Sheets

HALF-MESSAGE BASED MULTIPLEX COMMUNICATION INTERFACE CIRCUIT WHICH USES A MAIN MICROCONTROLLER TO DETECT A MATCH IN ADDRESSES AND GENERATE A QUALIFIED SIGNAL

BACKGROUND OF THE INVENTION

1. Field of the Invention

This invention relates to a multiplex transmission system of the type used in automotive applications for transmitting serial data message formats among a plurality of multiplex nodes connected to a common multiplex transmission line, and more particularly to a pulse width modulation multiplex transmission system operated in accordance with Society of Automotive Engineers standard J1850.

2. Prior Art

Messages transmitted from an originating node in a multiplex communication system normally include priority/type bytes describing the group or function of the nodes that should receive the message, in addition to target bytes that may define the specific address or addresses nodes to receive the message. The transmitting node must receive confirmation or acknowledgment that the addressed node has received the message.

A typical received node includes interface circuitry that includes programmable memory for storing the address of the node as well as the priority and/or type functions for which the node is responsible. These stored type and target bytes must then be compared by the interface circuitry with the type and target bytes of all incoming messages in order to determine if the message should be received and processed. Since programmable memory within the interface circuit represents an added cost that increases complexity without increasing functionality, it is desirable to provide a node interface circuit that offloads this function to the host microprocessor at the node that already includes programmable memory and comparators capable of performing this function.

SUMMARY OF THE INVENTION

It is therefore an object of the present invention to provide interface circuitry that commands the host microcontroller to compare previously stored values corresponding to message identifiers that are addressed for receipt and processing at the node, so that the interface circuitry does not have to perform the storage and comparison functions necessary to qualify, accept and acknowledge incoming messages.

This and other objects are achieved by the present invention that includes a method and circuit for receiving frame messages connected to one or more nodes, each controlled by a microcontroller, along a common transmission line of a multiplex communication system. The method includes the steps of: (a) receiving the type and target bytes, and responsive thereto generating a first interrupt signal to the microcontroller at the node; (b) commanding the microcontroller, responsive to receiving the first interrupt signal, for qualifying the frame message by retrieving and matching one or more of the type and target bytes with corresponding bytes stored in memory within the microcontroller, and responsive thereto generating a qualified signal; and (c) receiving data bytes from the frame message only responsive to receiving the qualified signal from the microcontroller.

BRIEF DESCRIPTION OF THE DRAWINGS

Other objects, features and advantages of the present invention will be apparent from a study of the written description and the drawings in which.

DESCRIPTION OF THE PREFERRED EMBODIMENT

Figure 2:
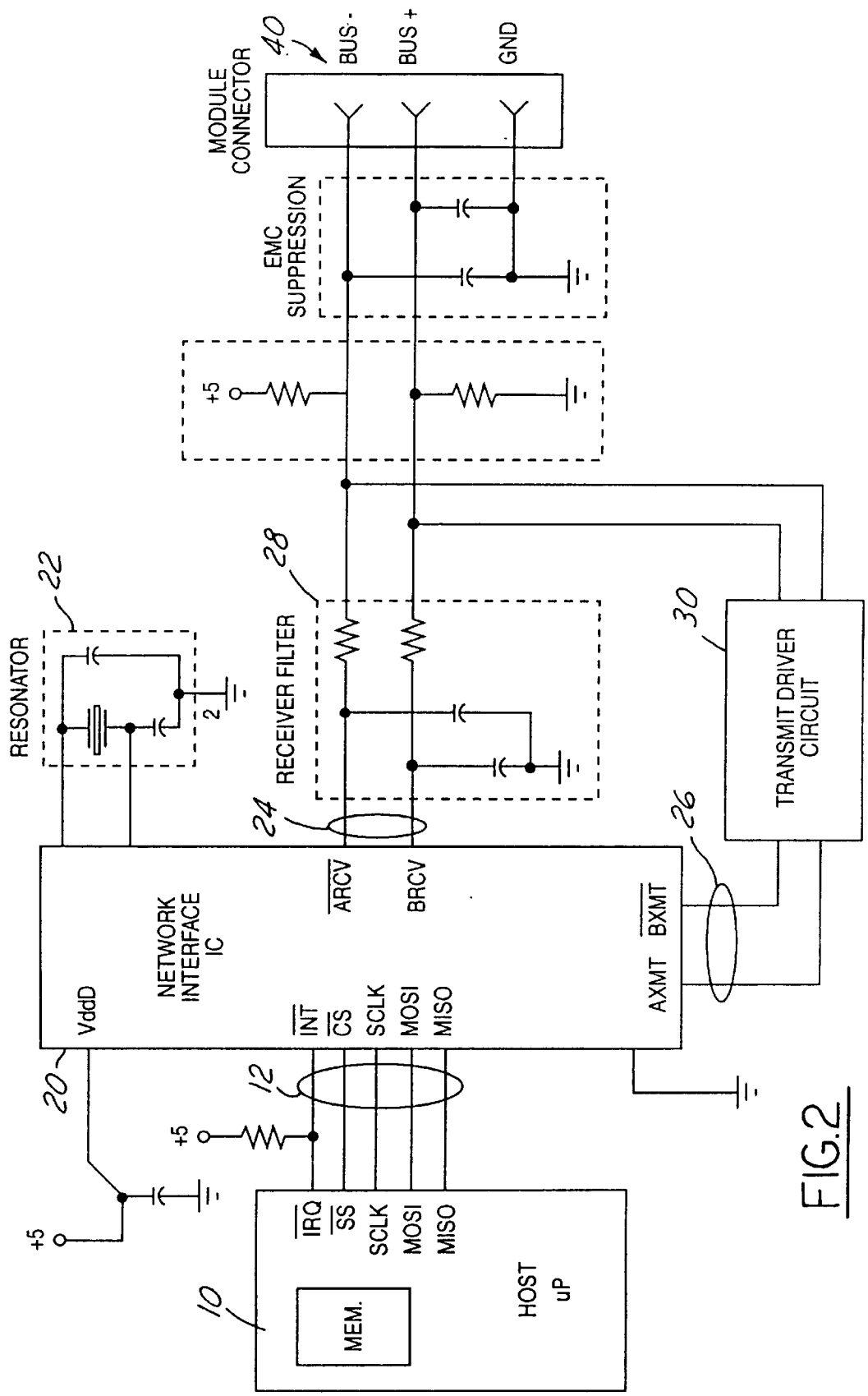
FIG. 2 is a schematic block diagram of the node interface circuit and the host microcontroller that cooperate at the node of the multiplex communication system.

A circuit diagram for a typical node in a multiplex communication system is illustrated generally in FIG. 2. and includes a host microprocessor 10, typically a Motorola 68HC11 or a Texas Instrument TMS370, which is coupled through a standard 5 line SPI interface 12 to the interface integrated circuit, hereinafter referenced as the network interface circuit 20 in accordance with the present invention. In the first preferred embodiment, the network interface circuit 20 is Ford part number N7100070FTCFCA that includes host interface digital circuitry, transceiver digital logic circuitry and analog receive comparators, together with miscellaneous oscillators and buffer circuitry.

A 4 megahertz resonator 22 is coupled to the network interface integrated circuit 20 in order to provide a stable frequency standard. The network interface circuit 20 includes a pair of receive input signal lines 24, and a pair of transmit signal output lines 26 that are connected to transmit driver circuitry 30. The transmit driver circuitry 30 generates the appropriate voltage levels required to interface with the main communications network bus 40, which in the preferred embodiment of the present invention operates in accordance with, an automobile industrial standard for data communications network interfaces, SAE Recommended Practice J1850 class B Data Communications Network Interface, dated May 5, 1993. The signal format used in the present invention and in SAE standard J1850 is explained more fully in U.S. Pat. Nos. 4,715,0311 and 5,418,526. Receiver filter elements 28, comprising series resistors and parallel capacitors, provide input protection and noise filtering functions on the receive input PWM signals from the network bus 40.

Figure 1:
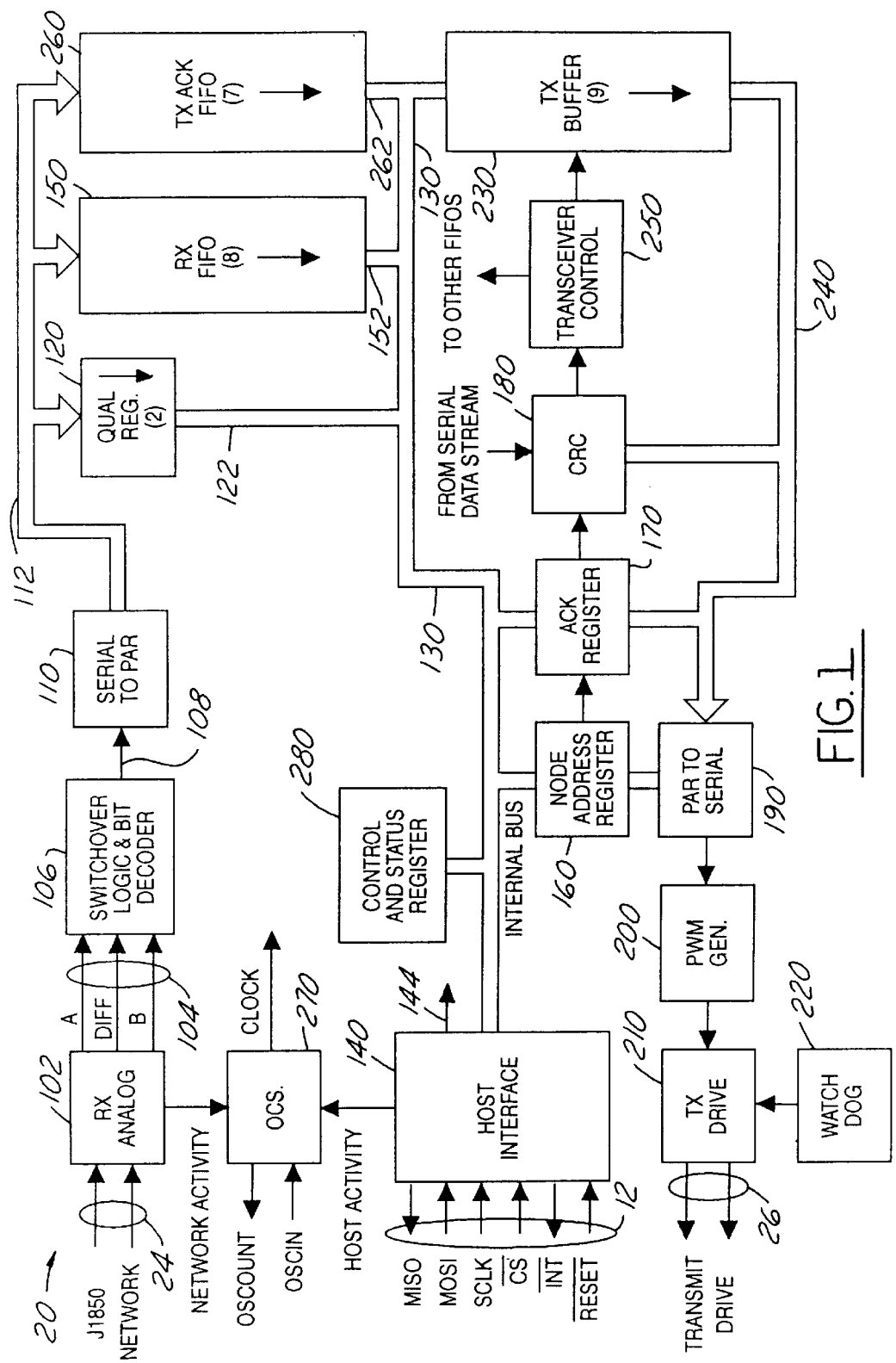
FIG. 1 is a schematic block diagram of a node interface circuit in accordance with the present invention.

With reference to FIG. 1, a schematic block diagram for the network interface circuit 20 is illustrated as including receive input signal lines 24 and transmit signal output lines 26 as previously described. The input lines 24 are coupled to a receiver analog comparator 102 that includes two single ended comparators for comparing each of the input lines to a voltage threshold and also includes a differential comparator for comparing the difference in the potential between the two input signal lines 24. Three digital output lines 104 from receive analog comparator 102 are coupled to an input of fault tolerant switchover logic and bit decoders 106. These logic circuits select between the input lines in order to minimize bit error rates and the effect of network faults. A single output 108 from the bit decoders 106 is coupled to the input of a serial to parallel converter 110. The serial bit rate at the input 108 is approximately 41.7 kilobits per second, while the output of the serial to parallel converter 110 includes 8 parallel bits clocked at one-eighth of the input frequency. The output signal of the serial to parallel converter 110 is coupled to an internal signal data bus 112 that feeds other elements of the network interface circuit 20.

The internal signal data bus 112 is coupled to message qualification registers 120, which store the first 2 bytes of the incoming message frame from the communication network bus 40. The outputs of the message qualification registers 122 are coupled to a host interface bus 130, which in turn is coupled to the host microcontroller 10 (not illustrated in FIG. 1) through host interface control logic 140 and standard SPI interface 12.

Transceiver control logic 250 is responsible for controlling the reception and transmission of message frames on the network. During data reception, it controls the movement of data from the output of the serial to parallel converter 110, to the message qualification registers 120, to a receive FIFO 150, and to a TX ACK FIFO 260. During message transmission, it controls the movement of data to a parallel to serial converter 190 from a TX buffer 230 and a node address register 160.

After the first two bytes of the incoming message frame are successfully received and stored in the message qualification registers 120, the transceiver control logic 250 instructs the host interface control logic 140 to generate an interrupt request to the host microcontroller 10. The host interface control logic 140 accomplishes this by pulling the interrupt request host interface line (INT) 300 from high to low. This interrupt request is referred to as the qualification interrupt request or first interrupt signal.

The host microcontroller 10 responds to this interrupt request by asserting the chip select (CS) signal 400 and commanding the host interface control logic 140 to fetch the contents of the message qualification registers 120 using a predetermined sequence of byte transfers across the SPI interface 12.

The host microcontroller 10 then compares the contents of the message qualification registers 120 with pre-determined lists of values for the type and target bytes stored in internal programmable memory, and determines whether the network interface circuit should continue the reception and acknowledgment of message frame. The host microcontroller 10 transmits the desired response to the network interface circuit 20 through a predetermined command sequence across the host interface 12.

Figure 3:
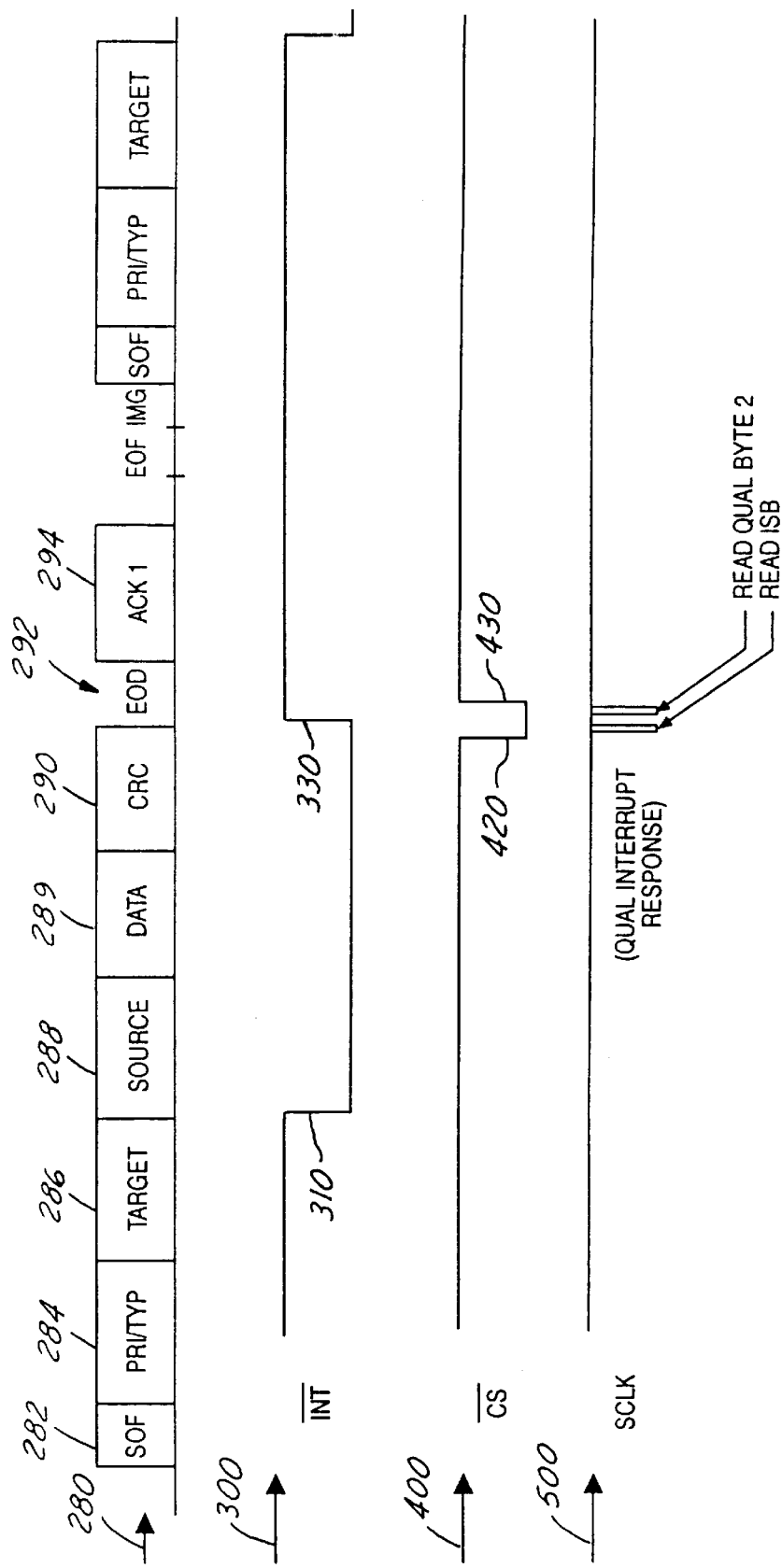
FIG. 3 illustrates the frame message bytes and the interrupt and chip select signals processed within the interface circuit for the case where the message is not directed for the node processing the signal.

The internal signal data bus 112 is coupled to an input of a receiver FIFO 150 that includes 8 bytes of storage for the remainder of the incoming message data. The receiver FIFO 150 is used to store data for message types that contain data intended for the host microcontroller 10. The 8 bytes of data typically include a source/transmit ID byte, 0–7 data bytes, a CRC byte and an EOD (End of Data) bit as illustrated in FIG. 3.

If the host microcontroller 10 has commanded the network interface device 20 to continue the reception and acknowledgment of the message frame in response to the qualification interrupt request, then following the receipt of the EOD network signal the transceiver control logic 250 begins transmission of the message acknowledgment byte(s) and instructs the host interface control logic 140 to generate an interrupt request to the host microcontroller 10. This interrupt request is referred to as the receive complete interrupt request or the second interrupt signal.

The host microcontroller 10 responds to the receive complete interrupt request by asserting the chip select signal and commanding the host interface control logic 140 to provide it with the contents of the receive FIFO 150. The host interface control logic 140 accomplishes this by moving data from the receive FIFO output 152 across interface bus 120 and across the SPI interface 12.

The type of message acknowledgment returned by the network interface circuit 20 depends upon the type of message frame that is received. The transceiver control logic 250 determines the appropriate acknowledgment format by examining the type of the received message, which is stored in the message qualification registers 120. Most message types are acknowledged by transmitting the contents of the node address register 160. Other message types are acknowledged by transmitting the contents of the ACK data register 170 followed by a CRC byte from the CRC generator 180.

The ACK acknowledgment bytes are processed in a converter 190 from a parallel to a serial bit stream, which is then fed to a pulse width modulated (PWM) generator 200. The output of the PWM generator 200 is coupled to transmitter drive circuitry 210, which in turn is coupled to the transmit signal output line 26 as previously discussed. The PWM generator 200 encodes the bits from the parallel to serial converter 190 in accordance with the pulse width modulation scheme of SAE standard J1850. Watchdog circuitry 220 limits the length of the pulse width modulation signal and also limits the length of the data frame which can be transmitted, both in accordance with requirements of SAE standard J1850.

In order to transmit a data message, the host microcontroller 10 sends a transmit command followed by the data to be transmitted to the network interface circuit 20 through the SPI interface 12. The host interface logic 140 decodes the transmit command, and then routes the data to be transmitted across the host interface bus 130 to transmit buffer 230. The transmit buffer 230 comprises digital storage for up to nine bytes of data. An output of the transmit buffer 230 is coupled to an internal transmit data bus 240, that is then coupled to the input of the parallel to serial converter 190, the function of which has been previously discussed. The transceiver controller 250 monitors the outputs from the switchover logic and bit decoders 106, and determines when a valid transmission opportunity exists on the communications network bus 40 at the receiver input 24. When a valid transmission opportunity occurs, the transceiver controller 250 moves data from the transmit buffer 230, as well as the node address register 160, to the parallel to serial converter 190. This data is then converted to PWM format by the PWM generator 200 and transmitted by the transmit drivers 210 over the transmit output lines 26 to the main communications network bus 40.

After completion of the transmission of the data from the transmit buffer 230, the transceiver controller 250 commands a CRC checker/generator 180 to transfer the contents of the generated CRC byte over the internal transmit data bus 240 to the parallel to serial converter 190. The CRC byte is then transmitted over the transmit output lines 26.

Following the transmission of the CRC byte, the transceiver controller 250 waits for the end of the data field, and then any acknowledgment bytes that appear on the network at the receiver inputs 24 are received and stored in a seven byte transmit acknowledgment FIFO 260. When the End of Message byte is detected, the transceiver control logic 250 instructs the host interface control logic 140 to generate an interrupt request to the host microcontroller 10 in the manner previously described. This interrupt request is referred to as the transmit complete interrupt request or third interrupt signal.

The host microcontroller 10 responds to the interrupt request by asserting the chip select line 400 and commanding the host interface control logic 140 to fetch the transmission completion status, and optionally the contents of the transmit acknowledgment FIFO, using a predetermined sequence of byte transfers across the SPI interface 12.

An oscillator circuit 270 is coupled to the three terminal resonator 22 (illustrated in FIG. 2), and provides a stable clock signal for driving the internal logic of the system. Various control and status registers 280 are provided for conducting housekeeping duties and detecting network faults.

Figure 4:
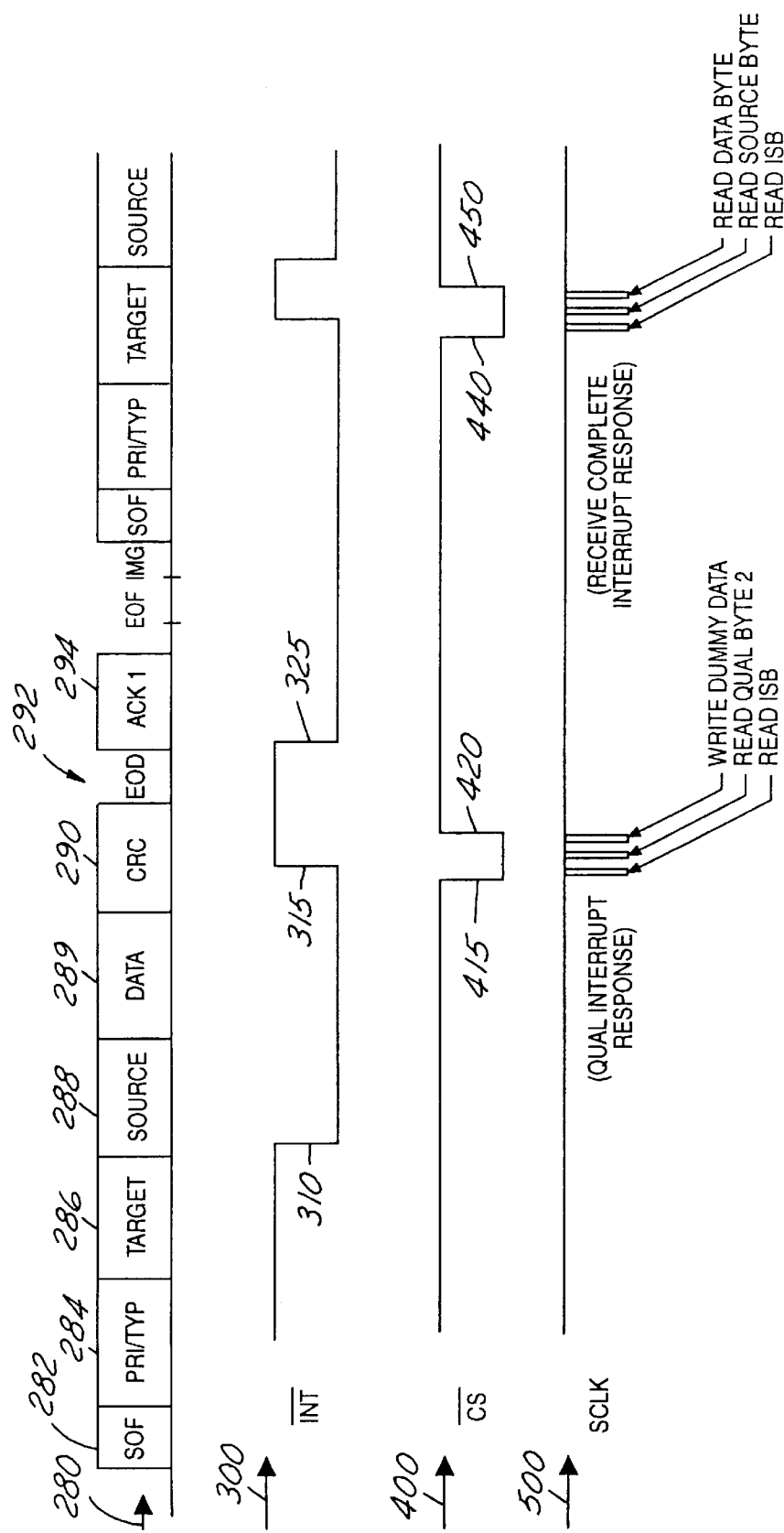
FIG. 4 illustrates the frame message bytes and the interrupt and chip select signals processed within the interface circuit for the case where the host microcontroller has received and examined the priority/type and target bytes and has determined that the frame message should be processed at the node, and has generated an acknowledgment to the originating node.
Figure 5:
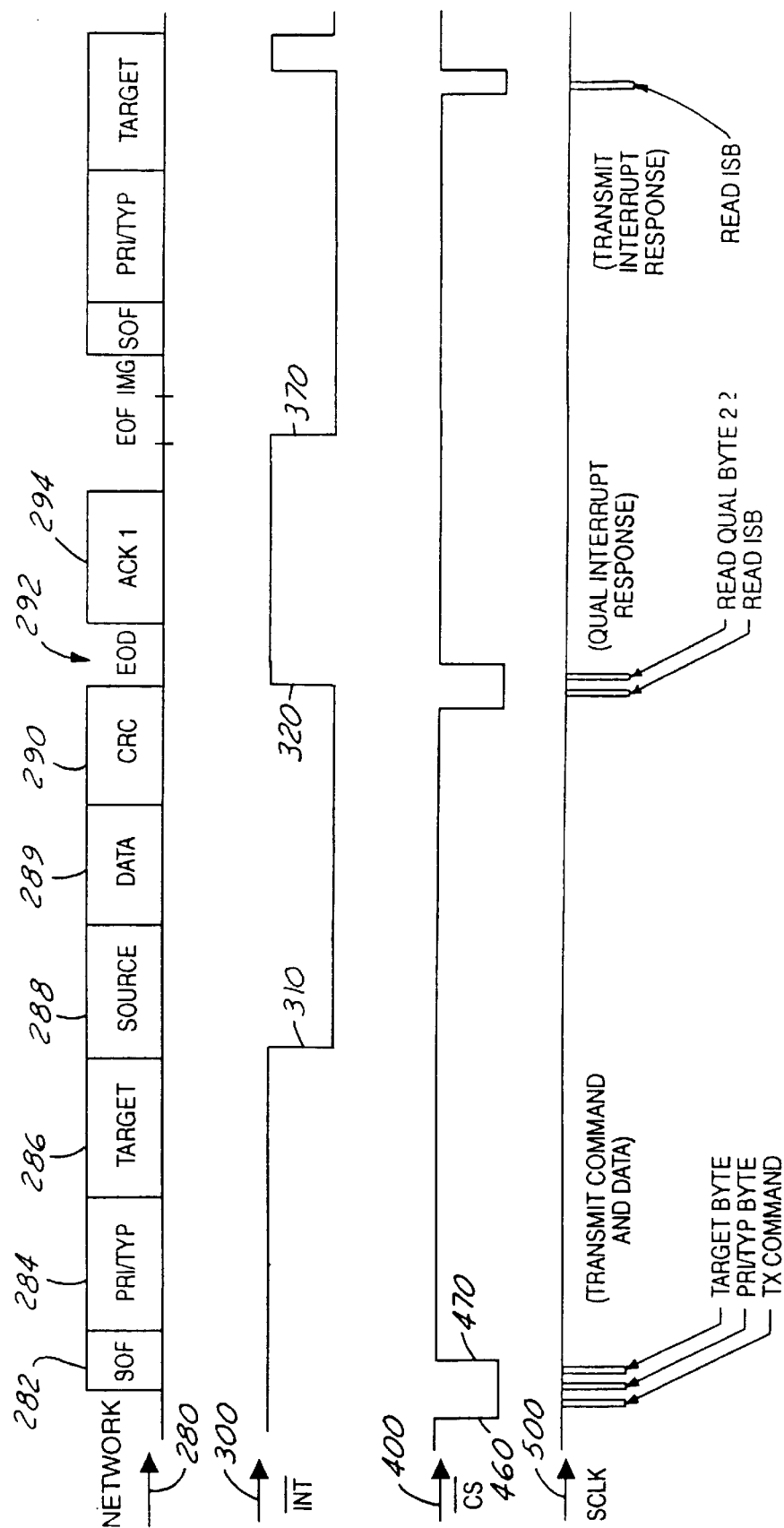
FIG. 5 illustrates the frame message bytes and the interrupt and chip select signals processed within the interface circuit for the case where the host microcontroller has commanded a message transmission, and has received and examined the transmitted priority/type and target bytes to determine whether receipt and acknowledgment of the message will be required if arbitration is lost.

FIGS. 3, 4 and 5 illustrate how the interrupt request signals 300 are generated in relationship to various types of messages on the main communications network bus 40. With specific reference to FIG. 3, the message frame 280 comprises an SAE standard J1850 message frame and includes a start of frame network element 282, a priority/type byte 284, a target byte 286, a source address byte 288 and a CRC byte 290. The End of Data network element 292 follows the CRC byte 290, and in turn is followed by any required acknowledgment bytes 294 to be transmitted before the End Of Frame (EFO) byte (an in-frame acknowledgment) as illustrated at the top of page 3.

With continuing reference to FIG. 3, the interrupt signal 300 from the host interface logic 140 remains high until the end of the target byte 286, at which time it transitions to low 310. This interrupt request is passed to the host microcontroller 10 from the host interface logic 140 as previously explained. The chip select signal 400 and the system clock signal 500 are shown to illustrate the processing of the interrupt request by the host microcontroller 10. The host microcontroller 10 asserts the chip select signal 400 at transition 420, processes the qualification interrupt request, and then deasserts the chip select signal 400 at transition 430 following the completion of the interrupt processing.

In accordance with the present invention, the host microcontroller 10 must complete the processing of the qualification interrupt request transmitted at the end of the target byte 286 before the completion of the EOD byte 292. In this manner, the host microcontroller 10 must determine within the specified time if the remainder of the message frame is to be received and if the message frame is to be acknowledged. In the example illustrated in FIG. 3, the host microcontroller 10 has determined, by comparing the priority/type and target bytes of the message frame as stored in the qualification registers 120, that the remainder of the message frame is not to be received and an acknowledgment signal will not be transmitted. The host microcontroller 10 also has commanded the network interface circuit 20 not to generate a receive complete interrupt request following the EOD byte and not to acknowledge the message. The acknowledgment byte 294 shown in FIG. 3 is not transmitted by the network interface circuit in this example. It is used to illustrate that some other network node may acknowledge a message that is not acknowledged by this network interface circuit. The network interface circuit 20 returns the interrupt signal 300 to high at transition 330 after the host microcontroller 10 has responded to the interrupt request. The interrupt signal 300 remains high until the next interrupt request in the next message frame.

FIG. 4 illustrates the case where the host microcontroller 10 has received and examined the priority/type bytes 284 and target bytes 286, and thereby has determined that the frame message should be processed at the node.

At transition 310 the network interface device asserts the interrupt line to notify the microcontroller 10 that the type and target of the message are available. The microcontroller 10 responds to the interrupt request by asserting the chip select signal line 400 at transition 415, and reading the type and target data bytes 284 and 286 from the message qualification registers 120. On examining these bytes and determining that the messages are intended for processing at the node, the microcontroller 10 initiates an acknowledge command and deasserts chip select signal 400 at transition 420 to complete the message qualification processing.

Following the reception of the End of Data bit 292 in the message frame, the network interface device 20 begins transmission of the message acknowledgment byte 294 and reasserts interrupt line 300 at transition 325 to notify the microcontroller 10 that the remainder of the message frame is available in the receive FIFO 150. The microcontroller 10 responds to this interrupt signal by asserting chip select 400 at transition 440, reads any required data from the receive FIFO 150, and then deasserts chip select at transition 450 to notify the network interface device 20 that the processing is complete.

FIG. 5 illustrates the process whereby a message transmission is initiated. The microcontroller 10 must first transfer the data to be transmitted to the network interface device 20 by asserting chip select signal 400 at transition 460. The transmit command is then followed by the data to be transmitted over the SPI lines 12 from the microcontroller 10 to the host interface logic 140. The end of the transmit command is designated by the deassertion of the chip select signal 400 at transition 470. The network interface device 20 then waits for 3 idle bit periods on the main communications network bus 40 or for a start of frame signal to be detected, at which time the microcontroller 10 begins the transmission of the data stored in the transmit buffer 230 in the manner previously discussed.

Note that the interrupt signal 300 is asserted at transition 310 following the reception of the priority/type and target bytes, 284 and 286 respectively. The microcontroller 10 must then perform the message qualification function as previously described. All messages that are transmitted must also go through the message qualification procedure to protect against the possibility that arbitration will be lost on the network requiring the remainder of the message frame to be processed as a reception. When arbitration is lost, the network interface device 20 changes from being a transmitter to a receiver of the message frame, and must determine if the message frame is to be received or ignored. When transmission of the message frame has been completed and the node receiving the message has acknowledged receipt, another interrupt request is generated at transition 370 to notify the host microcontroller 10 that a transmission of the frame has been completed.

Figure 6:
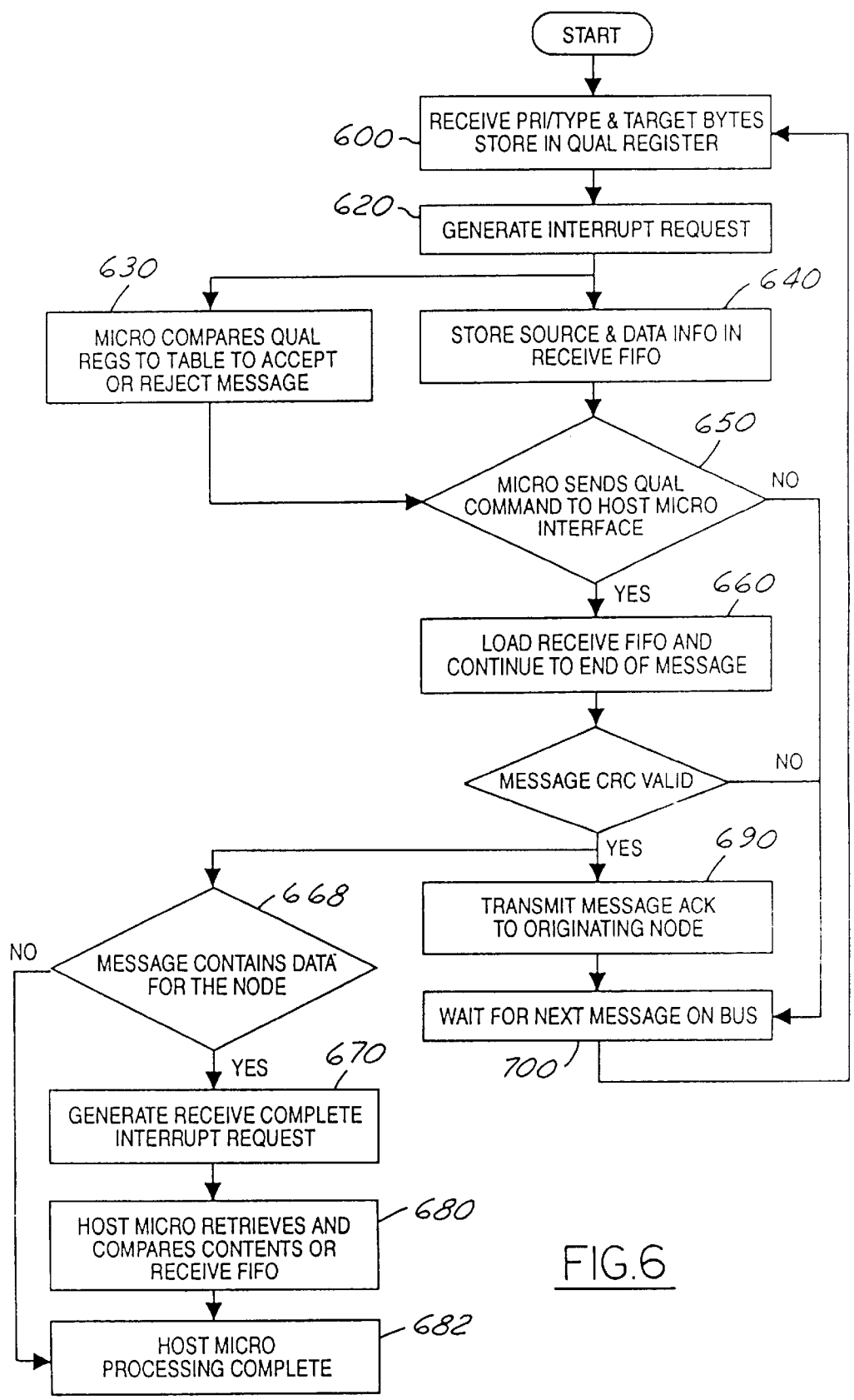
FIG. 6 illustrates a block diagram of the steps in accordance with the method of the present invention.

A flow chart for the process described above is illustrated with reference to FIG. 6. At step 600 the network interface device 20 receives the priority/type 284 and target 286 bytes and stores these signals in qualification registers 120. At step 620 the network interface circuit 20 generates an interrupt request to the microcontroller 10 in response to receipt of the priority/type and target bytes. In response to this interrupt request, at step 630 the microcontroller 10 examines the qualification registers 120 to determine if the message is directed toward the node by comparing the contents of the registers to data stored in tables within the microcontroller 10. At the same time in step 640 the network interface device 20 continues the reception and storage of the message frame, specifically the source and data bytes, in the receive FIFO 150.

At step 650 the microcontroller 10 transmits the qualification command to the host interface circuit 20 indicating that the message is either qualified or not qualified. If the message is not qualified, processing of the message frame terminates and the process moves to step 700 which requires waiting for the next message frame. If the message is qualified, then the process moves to step 660 wherein the loading of the received message into the receive FIFO 150 continues until the EOD byte is received. At step 664, if the message data bytes are received through EOD without error, then the process moves to steps 668 and 690. Otherwise the process moves to step 700. At step 668, if the message is of a type that contains data to be received by the host, then the process moves to step 670. Otherwise, the process moves to step 682. At step 670, the network interface circuit 20 generates a receive complete interrupt request to the host microcontroller 10. At step 680 the microcontroller 10 responds to the receive complete interrupt request and retrieves the contents of the receive FIFO 150 and continues processing the received data. At step 682 any required host processing of any received data is complete. In parallel with steps 668, 670, 680 and 682, the network interface device 20 transmits the acknowledgment byte(s) to the transmitting node at step 690 indicating that the message has been received and is being processed. Following step 690 the network interface device 20 waits for the next message at step 700.

In accordance with the present invention, the contents of the qualification registers 120 are transmitted to the host microcontroller 10 for comparison with previously stored values corresponding to message identifiers that are addressed for receipt and processing at a node. In this manner the network interface device 20 does not need to program, store and compare the priority/type and target bytes in the process of determining if the message is intended for receipt and processing at the node. These functions, which require the use of more expensive programmable memory storage devices, may be accomplished in a more economical and efficient manner within the already existing resources of the microcontroller 10.

While the preferred embodiment and mode of operation of the present invention have been illustrated and explained herein, one skilled in the art will be able to make minor changes and improvements in the design without departing from the spirit of the invention and the scope of the appended claims. It is intended that all descriptions of the preferred embodiment, including the drawings, should be interpreted as illustrative and not as limitations in the scope of the invention.

We claim:

1. A method for receiving frame messages communicated to one or more nodes, each controlled by a microcontroller, along a common transmission line of a multiplex communications system, comprising the steps of:
   (a) receiving type and target bytes and responsive thereto generating a first interrupt signal to the microcontroller,
   (b) commanding the microcontroller, responsive to receiving the first interrupt signal, for qualifying the frame message by retrieving and matching one or more of the type and target bytes with corresponding bytes stored therein, and responsive thereto generating a qualified signal,
   (c) receiving and storing data bytes from the frame message into temporary memory for subsequent processing only responsive to receiving the qualified signal from the microcontroller,
   (d) calculating a CRC value from, and generating a corresponding CRC signal representative of, the integrity of the data bytes received from the frame message; and
   (e) generating a second interrupt signal, responsive to receiving a valid CRC signal, for commanding the microcontroller to fetch the data bytes.

2. The method as described in claim 1 wherein step (b) further comprises the substep:
   (b1) generating the qualified signal only responsive to one or more of the type and target bytes matching corresponding bytes stored in a programmable memory within the microcontroller, whereby the qualified signal is representative of the frame message being directed to the node for processing.

3. The method as described in claim 1 wherein step (d) further comprises the substeps of:
   (d1) generating an acknowledge signal, responsive to receiving a valid CRC signal and an End of Data bit, for transmission to the node transmitting the message frame.

4. The method as described in claim 1 wherein step (a) further comprises the substep of:
   (a1) confirming that the frame message is a PWM digital signal complying with an automobile industrial standard for data communications network interfaces.

5. An interface device, interposed between a transmission line of a multiplex communications system and a microcontroller, for receiving frame messages communicated to one or more nodes, said interface device comprising in combination:
   a qualification memory coupled to the transmission line for receiving type and target bytes of the frame message, and responsive thereto generating a first interrupt signal;
   an interface controller, coupled to said qualification memory and the microcontroller, for commanding, responsive to receiving said first interrupt signal, the microcontroller to retrieve and match one or more of the type and target bytes with corresponding bytes stored in the microcontroller and responsive thereto generating a qualified signal; and
   a receive memory for receiving and storing, responsive to receiving said qualified signal, data bytes of the frame message, whereby the data bytes of the frame message are received in said receive memory but stored only responsive to the microcontroller generating said qualified signal.

6. The interface device as described in claim 5, wherein the microcontroller is of the type that includes programmable memory for storing therein selected type and target bytes representative of the function(s) and address of the node, and qualification means for comparing the type and target bytes from the frame message therewith and generating said qualified signal responsive only to at least one match therebetween.

7. The interface device as described in claim 5 further comprising error detecting means, coupled to the transmission line of the multiplex communication system, for receiving the frame message and generating a CRC signal representative of the integrity of the data bytes therein.

8. The interface device as described in claim 7 wherein said interface controller further comprises acknowledge means for generating an in-frame acknowledge signal responsive to receiving both a valid one of said CRC signals and an End of Data bit, whereby the node originating the message frame will receive acknowledgment that the frame message has been received by the intended node(s).

9. The interface device as described in claim 8 wherein said acknowledge means further comprises:
   means for commanding the microcontroller, responsive to receiving said valid one of said CRC signals, to fetch the data bytes from said receive memory; and
   means for generating said acknowledge signal responsive to receiving said valid one of said CRC signals and an End of Data bit from the frame message.

10. A method for receiving frame messages communicated to one or more nodes, each controlled by a microcontroller, along a common transmission line of a multiplex communications system, comprising the steps of:
   (a) receiving type and target bytes in a qualification memory and responsive thereto generating a first interrupt signal,
   (b) commanding the microcontroller, responsive to receiving the first interrupt signal, to qualify the frame message by retrieving, from the qualification memory, and matching one or more of the type and target bytes with corresponding bytes stored therein, and responsive thereto generating a qualified signal; and
   (c) receiving and storing data bytes in receive memory only responsive to receiving the qualified signal from the microcontroller, whereby the data bytes from the frame message are stored only after qualification of the type and target bytes.

11. The method as described in claim 10 further comprising the steps of:
   (d) calculating a CRC value from, and generating a corresponding CRC signal representative of, the integrity of the bytes in the frame message; and
   (e) generating a second interrupt signal responsive to receiving a valid CRC signal, for commanding the microcontroller to fetch the data bytes from the receive memory.

12. The method as described in claim 11 further comprising the step of:
   (f) processing the data bytes in the microcontroller responsive to receiving the second interrupt signal.

13. The method as described in claim 11 wherein step (d) further comprises the substeps of:
   (d1) generating an in-frame acknowledge signal, responsive to receiving a valid CRC signal and an End of Data byte, for transmission to the node transmitting the message frame.

14. The method as described in claim 10 wherein step (a) further comprises the substeps of:
   (a1) confirming that the frame message is a PWM digital signal complying with a Society of Automotive Engineers standard for data communications network interfaces.

15. An interface device, interposed between a microcontroller and a transmission line, for receiving frame messages communicated to one or more nodes along the transmission line in a multiplex communications system, comprising in combination:

a qualification memory coupled to the transmission line for receiving type and target bytes of the frame message, and responsive thereto generating a first interrupt signal;

an interface controller, coupled to said qualification memory and the microcontroller, for commanding, responsive to receiving said first interrupt signal, the microcontroller to retrieve and match one or more of the type and target bytes with corresponding bytes stored in the microcontroller and responsive thereto generating, before reception of the data bytes in the message frame is complete, a qualified signal; and a receive memory, coupled to said interface controller and the transmission line, for receiving and then storing, only responsive to receiving said qualified signal, data bytes of the frame message, whereby the microcontroller qualifies, before reception of the data bytes is complete, the frame message using only the type and target bytes.

16. The interface device as described in claim 15, wherein the microcontroller has stored therein selected type and target bytes representative of the functions and address of the node, and includes means for comparing the type and target bytes from the frame message therewith and for generating said qualified signal responsive to a match defined by the microcontroller.

17. The interface device as described in claim 15 further comprising error detecting means, coupled to the transmission line, for receiving the frame message and generating a CRC signal representative of the integrity of the bytes therein.

18. The interface device as described in claim 17 further comprising acknowledge means for generating an in-frame acknowledge signal responsive to receiving said qualified signal, a valid one of said CRC signals and an End of Data byte, whereby the node originating the message frame will receive acknowledgment that the frame message has been received and qualified by the intended node(s).

19. The interface device as described in claim 18 wherein said acknowledge means comprises:
   means for commanding the microcontroller, responsive to receiving said valid one of said valid CRC signals, to store and fetch the data bytes from said temporary memory; and
   means for generating said acknowledge signal responsive to receiving said valid one of said CRC signals and an End of Data byte from the frame message.

20. The interface device as described in claim 15 wherein the microcontroller generates said qualified signal prior to said receive memory receiving an End of Data byte in the frame message.

21. A method for receiving frame messages communicated to one or more nodes, each controlled by a microcontroller, along a common transmission line of a multiplex communications system, comprising the steps of:
   (a) receiving type and target bytes in a qualification memory and responsive thereto immediately generating a first interrupt signal,
   (b) commanding the microcontroller, responsive to receiving the first interrupt signal, to qualify the frame message by retrieving, from the qualification memory, and matching one or more of the type and target bytes with corresponding bytes stored in the microcontroller, and responsive thereto generating a qualified signal; and
   (c) receiving and storing data bytes in receive memory only responsive to receiving the qualified signal from the microcontroller, whereby the data bytes from the frame message are stored only after qualification of the frame message through the type and target bytes.

22. The method as described in claim 21 further comprising the steps of:

(d) calculating a CRC value from, and generating a corresponding CRC signal representative of, the integrity of the bytes in the frame message; and (e) generating a second interrupt signal responsive to receiving a valid CRC signal, for commanding the microcontroller to fetch the data bytes from the receive memory.

23. The method as described in claim 21 further comprising the step of:

(f) receiving and processing the data bytes in the microcontroller responsive to receiving the second interrupt signal.

24. The method as described in claim 23 wherein step (a) further comprises the substep of:

(a1) receiving only the type and target bytes before generating the first interrupt signal.

25. The method as described in claim 21 wherein step (c) further comprises the substep of:

(c1) temporarily receiving data bytes in a temporary memory pending receipt of the qualified signal form the microcontroller.

26. An interface device, interposed between a microcontroller and a transmission line, for receiving frame messages communicated to one or more nodes along the transmission line in a multiplex communications system, comprising in combination:

a qualification memory coupled to the transmission line for receiving only the type and target bytes of the frame message, and the promptly generating a first interrupt signal responsive thereto;

an interface controller, coupled to said qualification memory and the microcontroller, for commanding, responsive to receiving said first interrupt signal, the microcontroller to retrieve and match one or more of the type and target bytes with corresponding bytes stored in the microcontroller and then promptly generating a qualified signal responsive thereto; and a receive memory, coupled to the transmission line and the microcontroller, for receiving and storing, responsive to receiving said qualified signal, data bytes from the frame message, whereby the microcontroller qualifies the frame message after receiving only the type and target bytes.

27. The interface device as described in claim 26, wherein the microcontroller has stored therein selected type and target bytes representative of the functions and address of the intended nodes, and includes means for comparing the type and target bytes from the frame message therewith and generating said qualified signal responsive to a match defined therebetween.

28. The interface device as described in claim 26 wherein said receive memory further includes temporary memory for receiving and temporarily storing therein data bytes from the frame message pending receipt of said qualified signal.

29. The interface device as described in claim 26 wherein the microcontroller generates said qualified signal before completion of the reception of the data bytes.

30. The interface device as described in claim 29 further comprising error detecting means, coupled to the transmission line, for receiving the frame message and generating a CRC signal representative of the integrity of the bytes therein.

31. The interface device as described in claim 30 further comprising acknowledge means for generating an in-frame acknowledge signal responsive to receiving said qualified signal, a valid one of said CRC signals and an End of Data byte, whereby the node originating the message frame will receive acknowledgment that the frame message has been received and qualified by the intended node(s).

32. The interface device as described in claim 31 wherein said acknowledge means comprises:

means for commanding the microcontroller, responsive to receiving said valid one of said valid CRC signals, to store and fetch the data bytes from said receive memory; and means for generating said acknowledge signal responsive to receiving said valid one of said CRC signals and an End of Data byte from the frame message.

* * * * *